(12) United States Patent
Nakane

(10) Patent No.: US 6,294,857 B1
(45) Date of Patent: Sep. 25, 2001

(54) STRUCTURE FOR ATTACHING BRUSH HOLDERS TO AN ELECTRIC POWER TOOL

(75) Inventor: Shinichi Nakane, Okazaki (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/410,203

(22) Filed: Sep. 30, 1999

(30) Foreign Application Priority Data

Oct. 1, 1998 (JP) ................................................. 10-280252

(51) Int. Cl.$^7$ ................................................. H01R 39/38
(52) U.S. Cl. ............................................. 310/239; 310/47
(58) Field of Search ................................... 310/239, 245, 310/50, 47

(56) References Cited

U.S. PATENT DOCUMENTS

| | | | | |
|---|---|---|---|---|
| 3,656,018 | * | 4/1972 | Maher | 310/242 |
| 3,867,659 | * | 2/1975 | Seaburg | 310/242 |
| 4,292,560 | * | 9/1981 | Vorndran | 310/242 |
| 4,366,403 | * | 12/1982 | Simpson et al. | 310/239 |
| 4,581,499 | * | 4/1986 | Cousins | 200/1 V |
| 4,868,441 | * | 9/1989 | Bulick | 310/239 |
| 5,043,619 | * | 8/1991 | Kartman, Jr. | 310/242 |
| 5,402,027 | * | 3/1995 | Strobl | 310/239 |
| 5,696,418 | * | 12/1997 | Corbach et al. | 310/239 |
| 5,753,993 | * | 5/1998 | Steidle et al. | 310/239 |
| 5,793,141 | | 8/1998 | Simonsen et al. | 310/242 |
| 5,939,812 | * | 8/1999 | Wetzel | 310/245 |
| 5,955,802 | * | 9/1999 | Karasa et al. | 310/50 |

FOREIGN PATENT DOCUMENTS

| | | |
|---|---|---|
| 44 34 092 A1 | 5/1995 | (DE) . |
| 199 38 342 A1 | 2/2000 | (DE) . |
| 0 397 973 A2 | 11/1990 | (EP) . |
| 0 935 318 A2 | 8/1999 | (EP) . |
| 50-72901 | 11/1973 | (JP) . |
| 7-27274 | 10/1993 | (JP) . |

* cited by examiner

*Primary Examiner*—Joseph Waks
(74) *Attorney, Agent, or Firm*—Foley, Hoag & Eliot LLP

(57) ABSTRACT

A pair of brush assemblies 1 for use in an electric power tool each includes a brush holder 2 in which a carbon brush is inserted, a pair of elastic strips 7 protruding from the outside lower edges of the brush holder 2. The elastic strips 7 are folded back inward of the brush holder 2 such that each of the strips has a tapering, V-shaped cross-section and has elasticity in the widthwise direction of the brush holder 2. A pair of brush holder mounts 14 are provided on a motor housing of the electric power too, on which the brush assemblies 1 are installed. Each brush holder mount 14 includes a pair of positioning slots 16 for receiving the elastic strips 7 of the brush holder 2. When fitted in the positioning slots 16, the elastic strips 7 securely engage the side walls of the slots so as to prevent unintended removal of the brush holders 2 from the brush holder mounts 14.

10 Claims, 3 Drawing Sheets

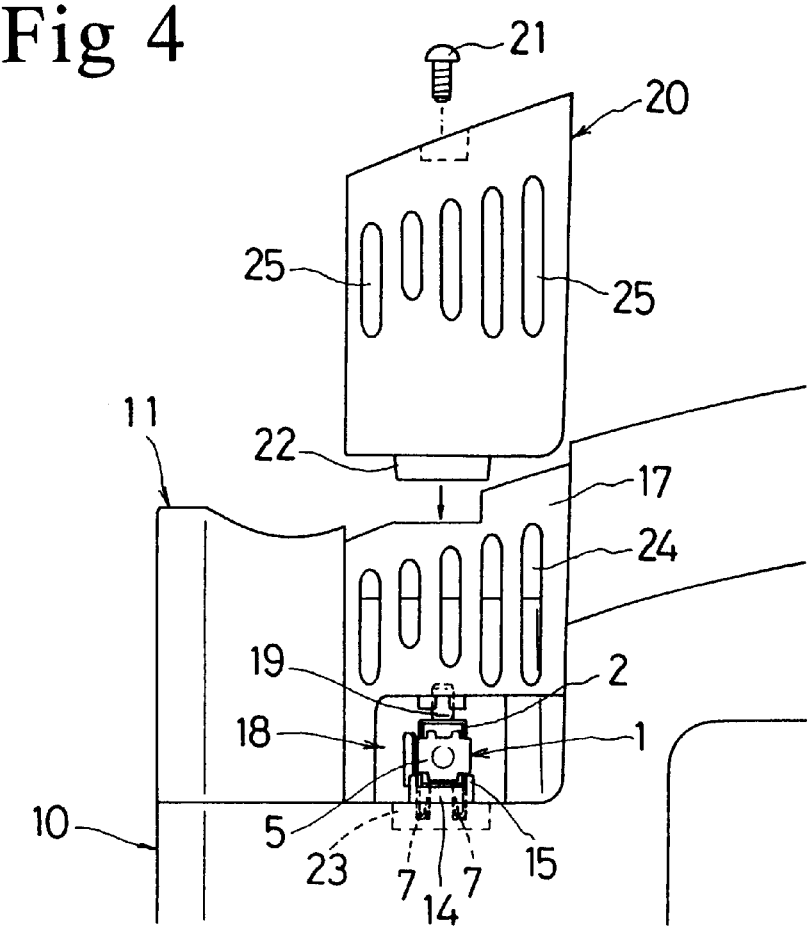
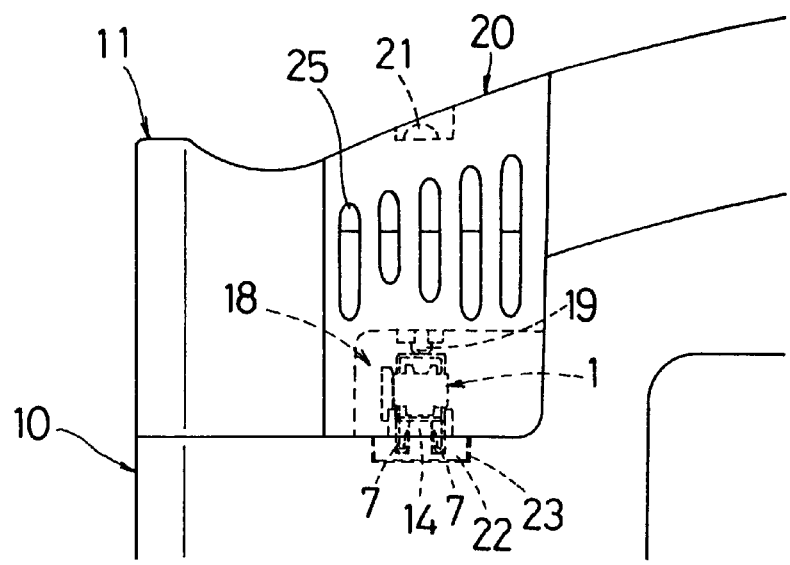

STRUCTURE FOR ATTACHING BRUSH HOLDERS TO AN ELECTRIC POWER TOOL

This application claims priority on Japanese Patent Application No. 10-280252 filed on Oct. 1, 1998, the contents of which are incorporated herein by reference.

BACKGROUND OF THE INVENTION

1. Field of the Invention

The present invention relates to electric power tools. More particularly, the present invention relates to a structure for attaching brush holders for holding brushes, such as carbon brushes, in predetermined positions of a housing and against a commutator motor of an electric power tool.

2. Description of the Related Art

In some electric power tools and other motor-driven appliances and devices to which the present invention is applicable, brush holders are attached to the housing with rivets or calking pieces provided on the brush holders so as to hold the brushes against the commutator of the motor of the tool. In another structure for attaching brush holders, brush holders are provided with barbed lugs for fitting into through-holes in the housing.

Such conventional structures, however, suffer from various shortcomings. Attachment of brush holders with rivets and calking pieces is time-consuming and thus reduces the efficiency at assembly sites. Moreover, as rivets must be provided as separate parts, they also raise the manufacturing cost of the entire devices. Although structures using barbed lugs require no separate parts, lugs often need to be fitted into the through-holes with jigs due to the difficulty in maintain close manufacturing tolerances.

Furthermore, brush holders are sometimes removed from electric power tools in order to recycle the housings. Such removal is troublesome if barbed lugs, rivets, or calking pieces are employed to secure the brush holders to the housing.

Various improved structures have been proposed to overcome the aforementioned shortcomings. For example, Japan Published Unexamined Utility Model Application No. 50-72901 discloses such a structure in which each of the two brush holders is set in a recess formed in a first housing portion and provisionally held in the recess with a L-shaped elastic member. According to this structure, the brush holders are secured by fitting a second housing portion to the first housing portion. Japan Published Unexamined Utility Model Application No. 7-27274 discloses another example, in which a pair of brush holders is received in a pair of grooves in a first housing portion, and a pair of ribs formed on the inner surface of a second housing portion is brought into contact with and secures the brush holders when the second housing portion is assembled to the housing portion. The first structure, however, still requires additional parts (the elastic members) in order to provisionally retain the brush holders in the recesses, whereas the brush holders of the second structure are not stably seated in the grooves or accurately positioned during the assembly thereof, thus affecting mounting or replacement of the brushes and connection and wiring of leads to the holders.

SUMMARY OF THE INVENTION

In view of the above-identified problems, an important object of the present invention is to provide a structure for attaching brush holders to an electric power tool without requiring any parts, such as rivets, calking pieces, or elastic members, in addition to the brush holders.

Another object of the present invention is to provide a structure for attaching brush holders to an electric power tool that securely and stably retains the brush holders even when the holders are provisionally retained in the tool.

Still another object of the present invention is to provide a structure that permits easy attachment of brush holders to and removal from an electric power tool.

The above objects and other related objects are realized by the invention, which provides a structure for attaching a brush holder in a predetermined position on a housing of a tool. The structure comprises: at least one positioning hole which has inner walls and is formed in the predetermined position in the housing; and at least one elastic strip protruding from the brush holder for insertion in the at least one positioning hole when the brush holder is attached to the predetermined position on the housing. The at least one elastic strip presses at least one of the inner walls of the positioning hole when the elastic strip is inserted in the positioning hole so as to removably attach the brush holder in the predetermined position.

According to one aspect of the present invention, the at least one elastic strip has a first end connected to the brush holder and a second free end which is folded back so as to have a tapering, V-shaped cross-section.

According to another aspect of the present invention, the brush holder includes an upper surface and two elastic strips which protrude in parallel to each other from bottom edges of the brush holder, with the free ends of the elastic strips folded back toward the upper surface of the brush holder.

According to still another aspect of the present invention, the structure can further comprises a pair of guide walls provided on the housing along the at least one positioning hole for guiding the folded elastic strips into the at least one positioning holes, thereby facilitating attachment of the brush holder to the predetermined position on the housing.

According to yet another aspect of the present invention, the housing is divided into first and second casing halves along a dividing plane intersecting the at least one positioning hole. Furthermore, the second casing half may include an elastic member that abuts the upper surface of the brush holder when the second casing half is assembled to the first casing half.

In accordance with another aspect of the present invention, the second casing half further includes a cut-out which exposes the brush holder when the brush holder and the second casing half are assembled so as to permit access to the brush holder.

In one practice, the second casing half further includes an outer cover detachably assembled to an outer surface of the second casing half so as to cover the cut-out.

In another practice, the elastic strip is a metal strip integrally formed with the brush holder and the elastic member is a cylindrical rubber pin provided on an inner surface of the second casing half.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings.

FIGS. 2 to 5 show a procedure for assembling the brush assemblies to the screwdriver, in which FIG. 2 shows one of the brush holders being set in the corresponding mount shown in FIG. 1;

FIG. 3 shows the brush assembly of FIG. 2 assembled with a handle cover held above a motor housing on which the brush assembly is mounted;

FIG. 4 shows the handle cover fitted on the motor housing of FIG. 3 with the brush assembly secured from above by a rubber pin and also shows an outer cover held above the handle cover; and FIG. 5 shows the outer cover set in place, thus completing the assembly of the housing of the electric power screwdriver, with the brush assembly and its associated elements shown in broken lines.

DETAILED DESCRIPTION OF THE PREFERRED EMBODIMENT

A preferred embodiment according to the present invention will be described hereinafter with reference to the attached drawings.

Figure 1:
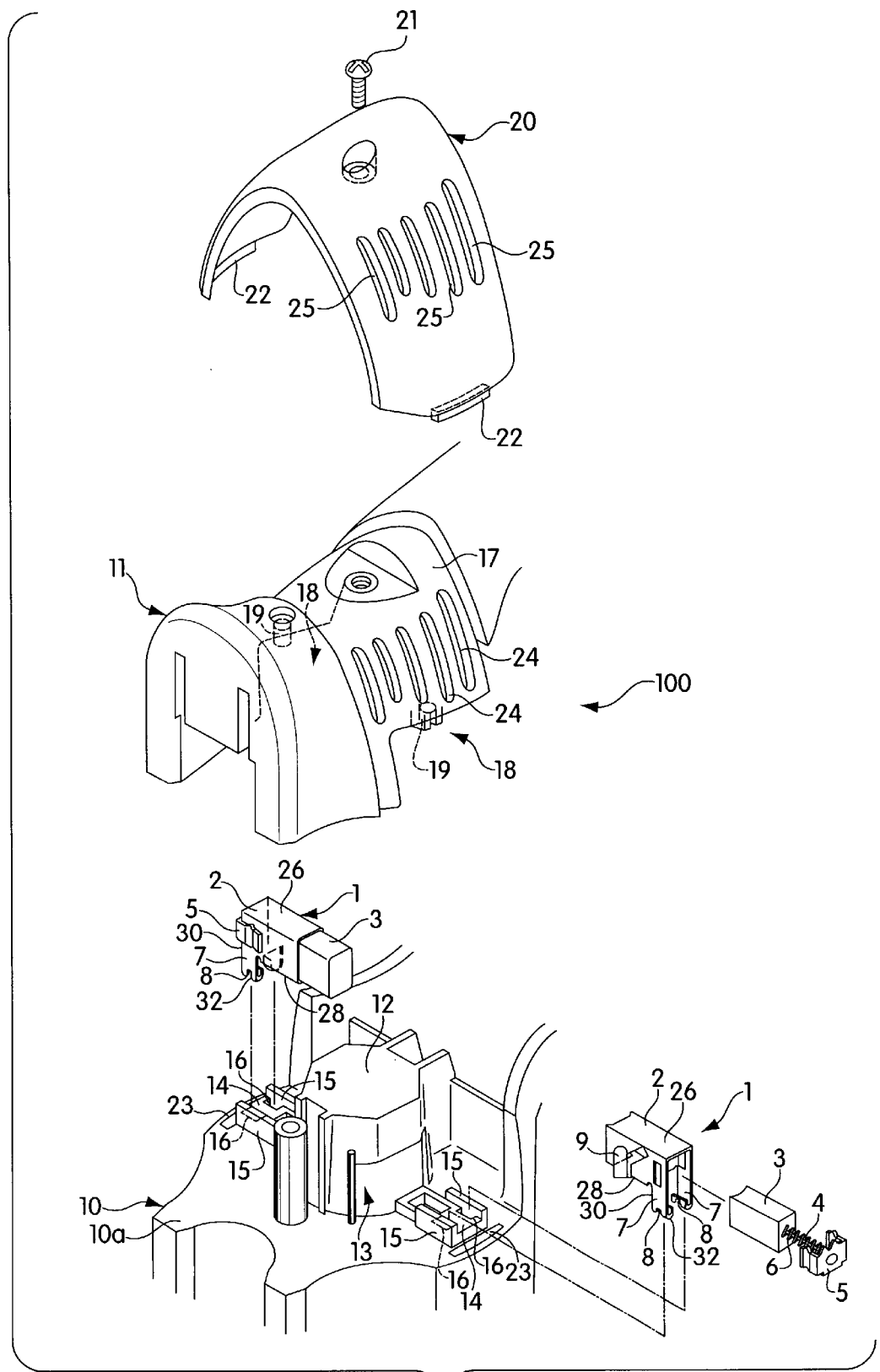
FIG. 1 is an exploded view of an essential part, including a pair of brush assemblies, of an electric power screwdriver to which the present invention is applied.

FIG. 1 is an exploded view of an essential part of an electric power screwdriver to which the present invention is applied. Reference numeral 1 denotes a pair of bush assemblies each of which includes a sheet-metal brush holder 2 having an upper surface 26 and a solid rectangular carbon brush 3 slidably inserted into the brush holder 2. In each brush assembly 1, a clip-shaped brush cap 5 is coupled to the carbon brush 3 via a pigtail 4. The brush assembly 1 additionally includes a coiled spring 6 between the carbon brush 3 and the brush cap 5. By inserting the carbon brush 3 into the brush holder 2 from the outer opening of the holder and fitting the brush cap 5 into the outer end of the brush holder 2, the carbon brush 3 is biased inwardly while projecting out of the brush holder. Provided at the lower outer edges of the brush holder 2 is a pair of strips 7 projecting downward from the bottom edges 28 of the brush holder. Each strip 7 has first end 30 connected to the brush holder 2 and a second free end 32 folded back inward of the brush holder 2 such that the second free end 32 of each of the strips has a tapering, approximate V-shaped cross section and each strip has elasticity in the widthwise direction of the brush holder 2. In addition, a slit 8 is formed in the fold of each elastic strip 7 so as to adjust the elasticity provided by the fold. Reference numeral 9 indicates an electric terminal cut out and folded outward from the side surface of each brush holder 2. Lead wires are connected to the terminals 9.

The screwdriver 100 includes a commutator motor (not shown), a generally cylindrical motor housing 10, and a handle cover 11 which is screwed to the motor housing 10. As illustrated in FIG. 1, the motor housing 10 is connected to the handle cover 11 on a plane extending through the commutator (not shown) of the motor. An armature support 12 protrudes from a flat surface 10a located on the aforementioned plane. The armature support 12 includes a pair of windows 13 that are formed on the opposite side surfaces of the support for exposing the commutator. A pair of brush holder mounts 14 is formed on the flat surface 10a where the mounts 14 oppose the respective commutator windows 13. Each brush holder mount 14 has a generally rectangular shape with two side walls 15 so as to seat the bottom surface of the brush holder 2. In addition, a pair of positioning holes, such as positioning slots 16, in which the elastic strip 7 can be fit is formed inside the walls 15. The opening of each of the positioning slots 16 is dimensioned such that the opening has approximately the same length as the width of the elastic strip 7 and a slightly smaller width than the thickness of the fold of the strip 7 in order to securely accommodate the elastic strip.

Figure 2:
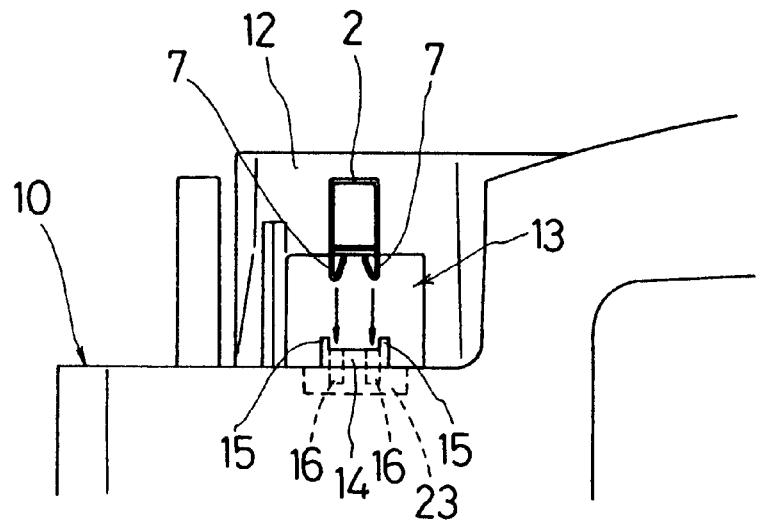

The handle cover 11 includes a recessed portion 17 directly above (as seen in FIG. 1) the brush holder mounts 14 and the armature support 12. A pair of cut-outs 18 are formed in the lower side surfaces of the recessed portion 17 so as to expose the brush holder mounts 14 and the portion of the flat surface 10a to the right in FIGS. 2 to 5. Referring to FIGS. 1 and 2, a pair of elastic members, such as rubber pins 19, is mounted inside the upper edges of the cut-outs 18 of the recessed portion 17 where the downward projecting rubber pins 19 abut the upper surfaces of the brush holders 2 in the respective mounts 14 when the handle cover 11 is set in place.

An outer cover 20 is additionally assembled to the recessed portion 17 with a screw 21 for fitting in and covering the recessed portion 17 of the handle cover 11. The outer cover 20 has a generally inverted V-shaped cross-section and includes at its lower ends a pair of lugs 22 that can be fitted into retainer slots 23 formed in the flat surface 10a of the motor housing 10. The outer cover 20 has a plurality of ventilation inlets 25 through which cooling air for the commutator motor is drawn in. Likewise, the handle cover 11 has a plurality of identical ventilation inlets 24 such that when the outer cover 20 is fitted in the recessed portion 17, the two sets of inlets 24 and 25 are aligned, thus placing the inside of the motor housing 10 and the handle housing 11 in communication with the outside thereof.

Figure 3:
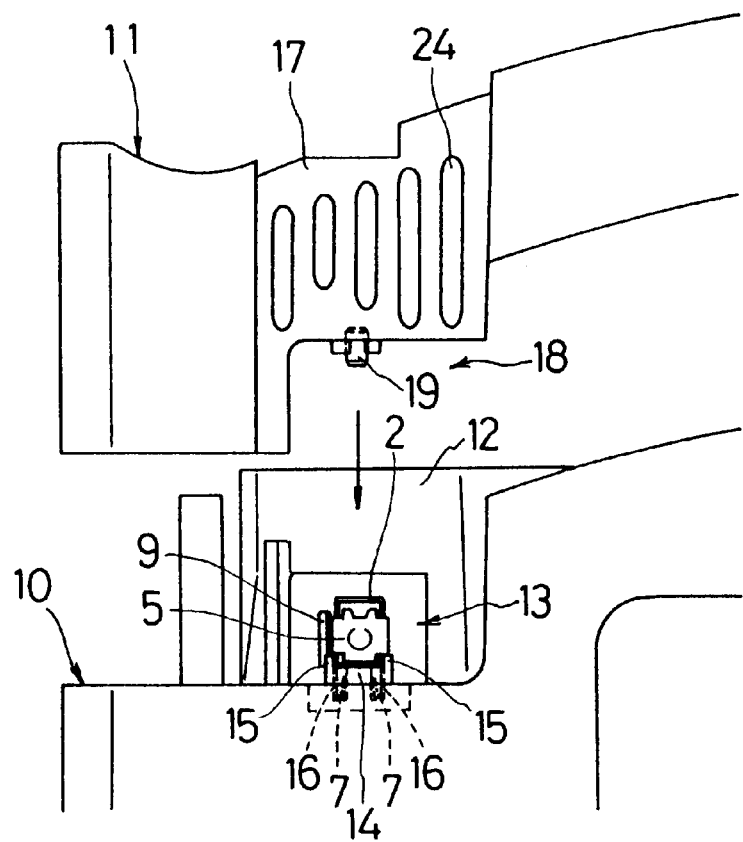

To assemble the foregoing structure, as a first step, the brush holders 2 are set in the brush holder mounts 14 of the motor housing 10 (see FIG. 2). More specifically, as shown in FIG. 3, when the elastic strips 7 of each brush holder 2 are tightly but removably fitted into the positioning slots 16, the brush holders 2 are accurately positioned on the mounts 14. Since the cross sections of the elastic strips 7 have a tapering, V-shaped bottom end, not only can the strips be smoothly inserted into the respective positioning slots 16, but the fold-back portions of the strips 7 also press the inner walls of the positioning slots 16. This creates a resistance in the elastic strips 7 to insertion and removal such that the brush holders 2 are secured to the mounts 14 with little possibility of inadvertent or unintended removal. It should be noted that the two side walls 15 provided for each brush holder mount 14 guide the elastic strips 7 when the strips are inserted into the slot 16 and limit the lateral movement of the brush holder 2 when it is fitted in the mount 14.

Next, a carbon brush 3 is inserted into each brush holder 2 from its outer opening and the brush cap 5 is fitted into the outer end of the brush holder 2, whereupon the coil spring 6 causes the carbon brush 3 to project inward and abut the commutator of the motor. As the brush holder 2 is stably secured to the mount 14, the carbon brush 3 and the brush cap 5 can be smoothly assembled, and wiring and connection of leads to the terminal 9 of each brush holder 9 can be performed easily. Referring to FIG. 4, when the handle cover 11 is screwed to the motor housing 10, the rubber pins 19 on the rear surface the recessed portion 17 come into abutment with the upper surfaces of the brush holders 2, securely holding the brush holders between the pins and the mountings. Additionally, the elasticity of the rubber pins 19 can absorb the errors of the brush holders 2 in height, so that the pins 19 surely abut and press the brush holder 14 to the mounting 14.

As shown in FIG. 5, after the outer cover 20 is fitted in the recessed portion 17 and the lugs 22 are fitted into the retainer slots 23 in the motor housing 10, the screw 21 is tightened so as to secure the brush assemblies 1 in place between the motor housing 10 and the handle cover 11.

As described above, according to the foregoing embodiment, when the elastic strips 7 are inserted into the positioning slots 16, the brush holder 2 can be set provisionally but securely in the predetermined position even before the handle cover 11 is fitted with the motor housing 10. This allows speedy and secure mounting of the brush holder 2, thus facilitating the assembly of the entire screwdriver. As no additional parts, such as rivets or calking pieces are required, the embodiment lowers manufacturing cost by reducing the number of parts and assembly steps. Furthermore, since the brush holder 2 can be easily attached to and removed from the mount 14 due to the elastic strips 7, servicing involving removal of the brush holder 2 is greatly facilitated. As mentioned above, brush holders are sometimes removed from the electric power tools in order to recycle the housings. The structure of the embodiment that allows quick attachment and removal of the brush holder renders such recycling a less time-consuming task.

According to the embodiment, the rubber pins 19 abut and press the upper surfaces of the brush holders 2 when the handle cover 11 is assembled to the tool, thereby simultaneously achieving two purposes (assembly of the cover and final fastening of the brush holders) in a single step.

In the foregoing embodiment, a pair of folded-back elastic strips are formed at the outer end of each brush holder 2. However, such elastic strips may be provided elsewhere on the brush holders, such as at the inner ends or in an intermediate position. Four, instead of two strips, may be provided, for example, at the four bottom corners of each brush holder 2. The elastic strips 7 may be folded back outwardly rather than inwardly, as in the embodiment. Moreover, the elastic strips 7 need not be shaped as in the embodiment; they may have a cylindrical shape with slits. Alternatively, a pair of strips may be inwardly curved toward each other such that the two strips, when fitted in the respective slots, pinch the inner walls of the positioning slots in the manner of a clip. The brush holder 2 may be modified in any other manner as long as they remain detachably and stably installed in the mounts.

In accordance with the foregoing embodiment, the handle cover 11 includes the cut-outs 18 and the outer cover 20 so that the brush assemblies 1 become exposed and accessible for servicing or maintenance when the outer cover 20 alone (but not the entire handle cover 11) is removed (see FIG. 4). Therefore, when the carbon brushes 3 are worn out and require replacement, the handle cover 11 need not be removed as in conventional structures. The brush caps 5 and the carbon brushes 3 can be exposed and removed from the motor housing 10 by simply removing the screw 21 and the outer cover 20, thus facilitating replacement of the carbon brushes.

In this embodiment, the outer cover 20 is completely detachable from the handle cover 11. However, depending on the configuration of the handle cover 11, one end of the outer cover 20 may be hinged to the handle cover 11 such that the cover 20 remains connected to the cover 11 and thus is not misplaced when the cut-outs 18 are uncovered. Alternatively, depending on the configuration of the housing, the outer cover may be configured to slide on the handle cover so as to selectively cover and expose the brush assemblies 1. Furthermore, instead of a single outer cover, two separate outer covers may be provided for the two brush assemblies.

Effect of the Invention

According to the present invention, brush holders can be mounted in the predetermined positions simply by inserting elastic strips formed on the brush holders into positioning slots in a tool housing. This structure permits speedy and efficient attachment of the brush holders to the housing. Not requiring any additional parts, such as rivets or calking pieces, the structure of the invention lowers the manufacturing cost by reducing the number of parts and assembly steps. Furthermore, since the brush holder can be easily attached to and removed from the mount due to the elastic strips, servicing involving removal of the brush holder is greatly facilitated. The structure of the invention, for example, renders recycling of the housing, which involves removal of the brush holders, a less time-consuming task.

The elastic strips of the invention can be obtained by a simple manufacturing process of folding back the strips inward of the brush holder such that each of the strips has a tapering, approximate V-shaped cross section and has elasticity in the widthwise direction of the brush holder. Due to this simple but effective structure, the strips can be smoothly inserted into the positioning slots in the brush holder mounts.

As a further advantage of the present invention, the housing of the electric power tool is divided into a first casing half (e.g., motor housing 10) and a second casing half (e.g., handle cover 11) on a plane in which the brush holders are located, with the first casing half 10 having retainer slots, and with elastic members, such as rubber pins 19, that abut the brush holders when the second casing half 11 is assembled to the first casing half. This structure simultaneously accomplishes both assembly of the cover and final fastening of the brush holders in a single assembly step.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A structure for attaching a brush holder in a predetermined position on a housing of a tool, comprising
at least one positioning hole which has inner walls and is formed in a predetermined position in the housing, and
at least one elastic strip protruding from the brush holder for insertion in the at least one positioning hole when the brush holder is attached to the predetermined position on the housing, wherein the at least one elastic strip has a first end connected to the brush holder and a second free end which is folded back inward of the brush holder so as to have a tapering, V-shaped cross-section, the at least one elastic strip pressing at least one of the inner walls of the positioning hole when the elastic strip is inserted in the positioning hole so as to removably attach the brush holder in the predetermined position.

2. A structure in accordance with claim 1, wherein the brush holder includes an upper surface and two elastic strips which protrude in parallel to each other from bottom edges of the brush holder, the free ends thereof being folded back toward the upper surface of the brush holder.

3. A structure in accordance with claim 1 further comprising a pair of guide walls provided on the housing along the at least one positioning hole for guiding the folded elastic strips into the at least one positioning holes, thereby facilitating attachment of the brush holder to the predetermined position on the housing.

4. A structure in accordance with claim 1, wherein the housing is divided into first and second casing halves along a dividing plane intersecting the at least one positioning hole, and further wherein the brush holder has an upper surface and the second casing half further includes an elastic member that abuts the upper surface of the brush holder when the second casing half is assembled to the first casing half.

5. A structure in accordance with claim 4, wherein the second casing half further includes a cut-out which exposes the brush holder when the brush holder and the second casing half are assembled, so as to permit access to the brush holder.

6. A structure in accordance with claim 5, wherein the second casing half further includes an outer cover detachably assembled to an outer surface of the second casing half so as to cover the cut-out.

7. A structure in accordance with claim 4, wherein the elastic strip is a metal strip integrally formed with the brush holder and the elastic member is a cylindrical rubber pin provided on an inner surface of the second casing half.

8. A structure for attaching a brush holder in a predetermined position on a housing of a tool, comprising at least one positioning hole which has inner walls and is formed in the predetermined position in the housing, and at least one elastic strip protruding from the brush holder for insertion in the at least one positioning hole when the brush holder is attached to the predetermined position on the housing, the at least one elastic strip pressing at least one of the inner walls of the positioning hole when the elastic strip is inserted in the positioning hole so as to removably attach the brush holder in the predetermined position, and the at least one elastic strip fitting within and not extending beyond the at least one positioning hole.

9. A structure in accordance with claim 8, wherein the at least one elastic strip has a first end connected to the brush holder and a second free end which is folded back so as to have a tapering, V-shaped cross-section.

10. A structure for attaching a brush holder in a predetermined position on a housing of a tool, comprising at least one positioning hole which has inner walls and is formed in a predetermined position in the housing, and at least one elastic strip protruding from the brush holder for insertion in the at least one positioning hole when the brush holder is attached to the predetermined position on the housing, the at least one elastic strip pressing at least one of the inner walls of the positioning hole when the elastic strip is inserted in the positioning hole so as to removably attach the brush holder in the predetermined position, wherein the housing is divided into first and second casing halves along a dividing plane intersecting the at least one positioning hole, and further wherein the second casing half further includes an elastic member that abuts the upper surface of the brush holder when the second casing half is assembled to the first casing half.

* * * * *